(12) United States Patent
Reines

(10) Patent No.: US 11,906,105 B1
(45) Date of Patent: Feb. 20, 2024

(54) OVER-DOOR, HANGING APPARATUS

(71) Applicant: Mirrotek, LLC, Norfolk, VA (US)

(72) Inventor: Jorge Reines, Miami, FL (US)

(73) Assignee: MIRROTEK, LLC, Norfolk, VA (US)

( * ) Notice: Subject to any disclaimer, the term of this patent is extended or adjusted under 35 U.S.C. 154(b) by 0 days.

(21) Appl. No.: 17/958,883

(22) Filed: Oct. 3, 2022

Related U.S. Application Data

(60) Provisional application No. 63/404,811, filed on Sep. 8, 2022.

(51) Int. Cl.
*F16M 13/02* (2006.01)
*A47G 1/16* (2006.01)

(52) U.S. Cl.
CPC ......... *F16M 13/022* (2013.01); *A47G 1/1653* (2013.01)

(58) Field of Classification Search
CPC ............................ F16M 13/022; A47G 1/1653
USPC ....................... 248/205.1, 215, 304, 339, 323
See application file for complete search history.

(56) References Cited

U.S. PATENT DOCUMENTS

| | | | |
|---|---|---|---|
| 6,854,610 B2 * | 2/2005 | Adams | A47G 25/0614 248/339 |
| 8,534,627 B2 * | 9/2013 | Kressin | A47G 1/20 248/323 |
| 8,746,644 B2 * | 6/2014 | Kressin | A47G 1/16 248/323 |
| 8,851,989 B2 | 10/2014 | Rosander et al. | |
| 9,386,867 B2 * | 7/2016 | Kressin | A47G 1/1653 |
| 9,480,350 B2 * | 11/2016 | Kressin | A47G 1/02 |
| 9,622,600 B2 * | 4/2017 | Kressin | A47G 1/1653 |
| 10,959,546 B2 | 3/2021 | Kressin et al. | |
| 2008/0245751 A1 * | 10/2008 | Moran | B44C 5/00 211/1 |

* cited by examiner

*Primary Examiner* — Todd M Epps
(74) *Attorney, Agent, or Firm* — OSTROLENK FABER LLP

(57) ABSTRACT

An apparatus that includes an over the door hanger having at least one hanging bracket and a hook bar supported by the at least one bracket, and a cross bar provided to engage the hook bar of the hanger to support a body, such as a mirror, on the upper edge of a door.

4 Claims, 6 Drawing Sheets

OVER-DOOR, HANGING APPARATUS

CROSS-REFERENCE TO RELATED APPLICATION

The present non-provisional patent application claims the benefit of and priority to U.S. Provisional Patent Application No. 63/404,811, filed Sep. 8, 2022, by Jorge Reines, and entitled "OVER-DOOR, HANGING MIRROR," the entire contents of which are incorporated herein by reference.

BACKGROUND OF THE INVENTION

The present invention relates to a hanging apparatus, in general, and to a hanging apparatus which is adapted to hang from the top of a door or similar support structure, in particular.

There are many over-the-door storage and/or hanging devices known in the art. These devices include brackets which mount over the door and provide a support for items such as hangers, mirrors or the like. Also, these types of devices include multiple pockets or supports for retaining shoes or the like. Typically, the shoe supports are fixed in position while the pocket units may collapse into a small dimension. However, the hanger supports are usually fairly rigid and extend outwardly from the door.

These hanger support devices may take the form of a small hook which supports one or two items or a larger bracket which extends substantially perpendicular to the door surface for supporting multiple hangers or similar devices substantially parallel to the surface of the door. In some cases, these hooks and/or brackets can be pivotally mounted in an over-the-door clip or attachment whereby the door can be placed close to a wall when the hook or bracket is not being used.

U.S. Pat. No. 10,959,546 discloses over the door hanging brackets which are individually attachable to an object such as a mirror. This arrangement requires the user to align the back of the mirror to the individual hanging brackets to support the mirror on the door, which can be a difficult task.

Many different embodiments for hanging mirrors over a door are described in patents that have issued to MCS Industries, Inc., including for example U.S. Pat. No. 8,851,989 (and its related patents), which describes height-adjustable supports. The contents of the aforementioned patent is incorporated by reference herein. But the expedients in these patents require manual dexterity, inasmuch as the person mounting the mirror must carefully align the mirror frame to register and align to small openings in the vertical brackets, which can be frustrating.

SUMMARY OF THE INVENTION

It is an object of the present invention to provide an over-the-door hanging apparatus for mirrors or the like that avoids the drawbacks of the prior art and enables far easier mounting to a door and/or adjusting the height of the mirror relative to the door frame.

An apparatus according to the present invention includes and over the door (OTD) hanger having at least one hanging bracket, but preferably at least two hanging brackets, and a hook bar supported by the at least one bracket or the at least two brackets.

In an apparatus according to the present invention, a cross bar is provided to engage the hook bar of the hanger to support a body, such as a mirror, on the upper edge of a door.

According to a preferred embodiment, the mirror, for example, has affixed to its rear surface three or more spaced cross bars. Each cross bar can be snagged by the hook bar of the hanger extending between the at least two hanging rods or brackets. The mirror mounting task is exceedingly simple, intuitive and takes seconds to complete.

Other features and advantages of the present invention will become apparent from the following description of the invention which refers to the accompanying drawings.

DETAILED DESCRIPTION OF PREFERRED EMBODIMENTS OF THE INVENTION

Figure 1:
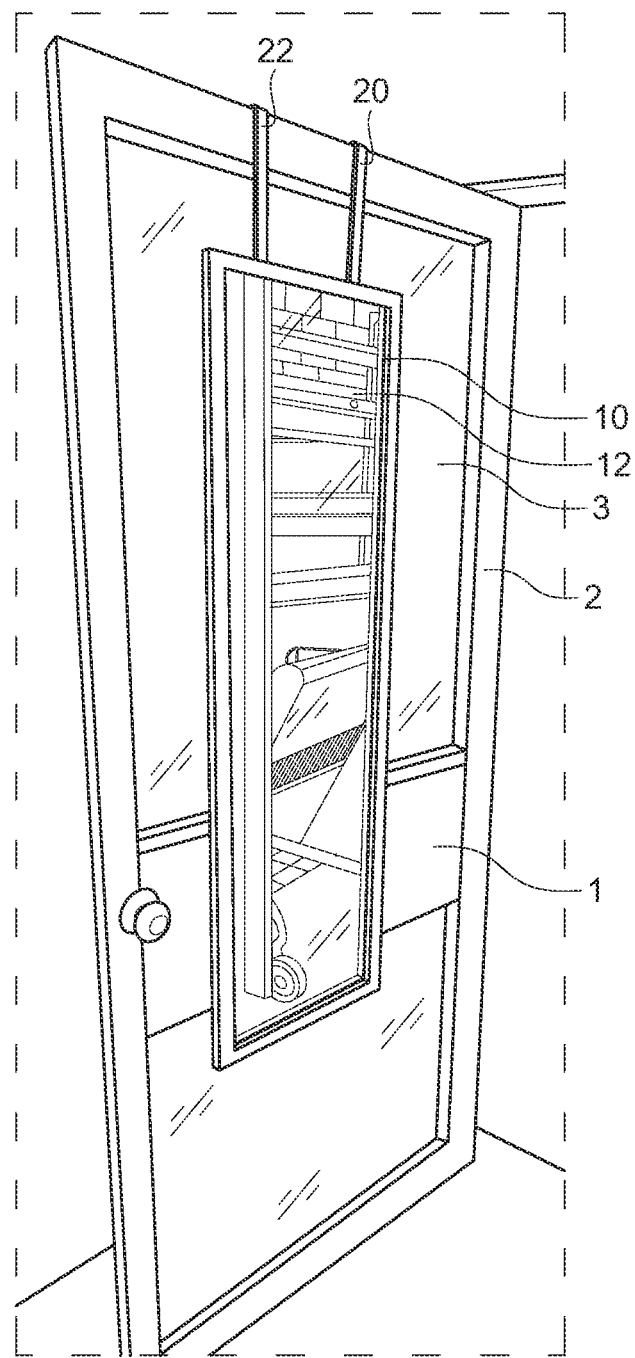
FIG. 1 shows a door supporting a hanging mirror with the over-the-door ("OTD") novel apparatus of the present invention.

FIG. 1 shows a door 1 with a frame 2 that supports and surrounds a glass pane 3. A mirror 10 having a reflecting surface 12 is supported over the door 1 by an apparatus according to the first embodiment of the present invention, which includes two hanging brackets 20 and 22.

Figure 2:
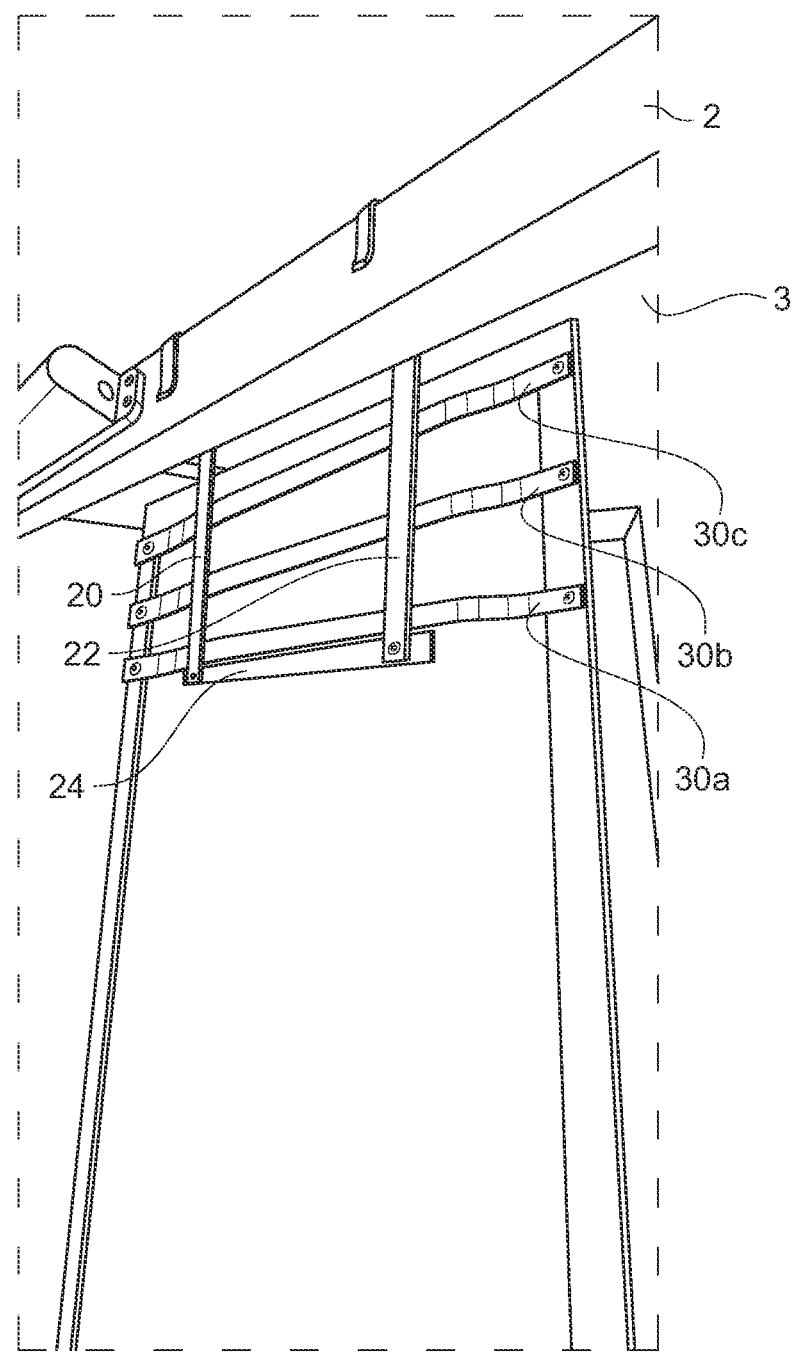
FIG. 2 shows the OTD hanging components, namely the cross bars, mounted to the rear of the mirror and engaging the hook bar of the hanger.

Referring to FIG. 2, in the first embodiment, one hook bar 24 is connected at each respective end thereof to a respective end of one of the hanging brackets 20, 22.

In an apparatus according to the first embodiment, at least three cross bars 30a, 30b, 30c may be provided to engage the hook bar 24 of the hanger. As seen through the glass pane 3, the three, horizontally extending, cross bars 30a, 30b and 30c may be screwed, nailed, or otherwise attached to the frame of the mirror 10 at their distal ends. The hanging brackets 20 and 22 have "C" sections (hooks) that fit over the top of the door. At their bottom ends, the hanging brackets 20, 22 are connected to the hook bar 24.

As seen in FIG. 2, each cross bar 30a, 30b, 30c, when mounted, is spaced from the rear of the mirror 10, and the hook bar 24 has a section that is receivable in the space between (under) a cross bar 30a, 30b, 30c to support the mirror on the door. Instead of the bars 30a, etc., one may connect across the back of the mirror three or more spaced wires that can be "hooked" by the hook bar 24 and thereby support the mirror at a desired height relative to the door.

FIG. 2 shows the hook bar 24 received in the space between the lowest cross bar 30a to catch and hook the lowest cross bar from the underside (the side farthest from the top of the door) of the lowest cross bar 30a.

Figure 3:
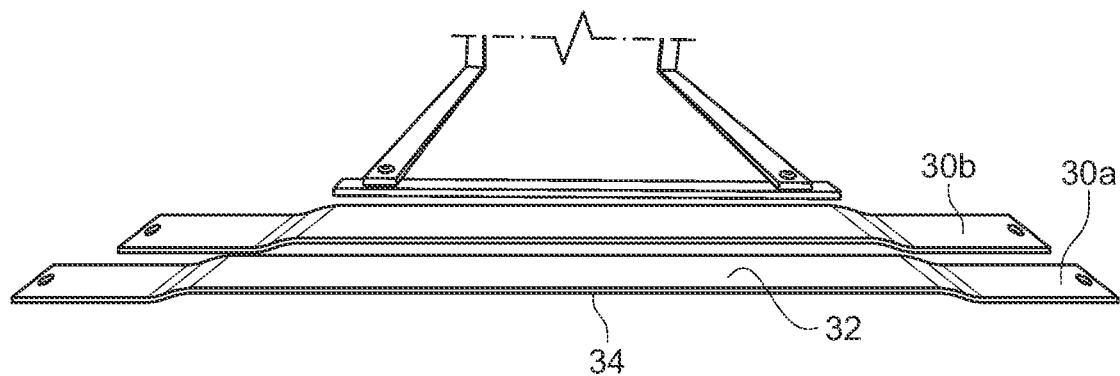
FIG. 3 shows cross bars of the OTD apparatus, which are screwed or otherwise affixed to the back of the mirror, and the hanger of the OTD apparatus, in a disassembled state.

As shown in FIG. 3, each of the cross bars 30a, 30b and 30c has a raised section 32 between its distal ends defining a gap to serve as the hooking space 34 in which the hook bar 24 is receivable as described above.

Figure 4:
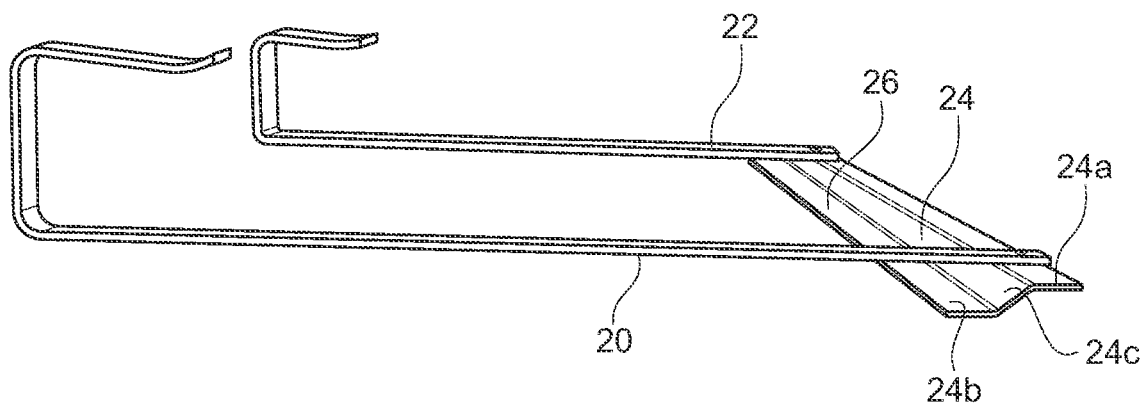
FIG. 4 shows the hanger with at least two hanging brackets and the hook bar that is configured to snag under a selected one of the mounted cross bars to support the mirror at a desired height.
Figure 5:
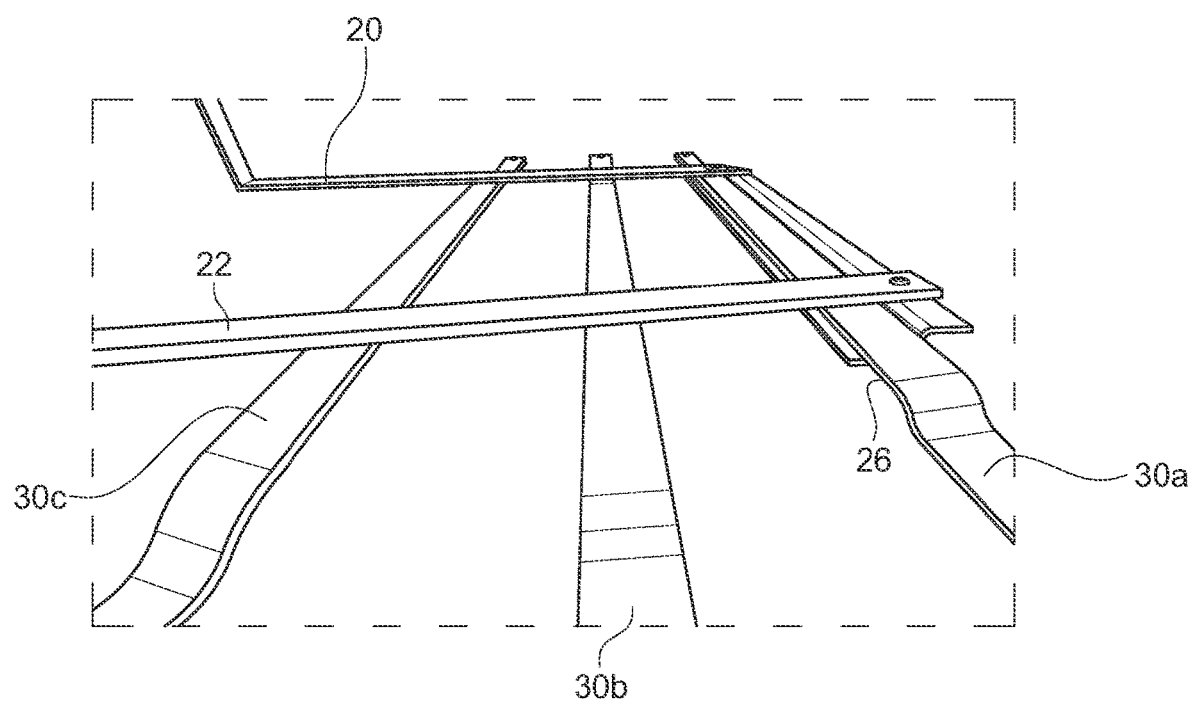
FIG. 5 shows the hook bar engaged with the lowest cross bar.

More specifically, as shown in FIG. 4, the hook bar 24 includes a hooking section 24a which is receivable in a hooking space 34 defined by a cross bar 30a, 30b, 30c, when the cross bar is mounted. The section 24a is in a plane spaced from (elevated above) a section 24b, which is attached to the ends of hanging brackets 20, 22 as described above. The sections 24a and 24b are joined by a connecting section 24c. This construction of the hook bar 24 allows/enables the hooking section 24a to fit under and in the gap 34 provided under each mounted cross bar 30a, 30b, 30c. Thereby, mounting the mirror to the door 1 is rendered exceedingly easy. All one would need to do is hang the hanging barracks 20, 22 over a door, and then hang the mirror having the mounted cross bars 30a, 30b, 30c (or whatever object that that is to be supported by the cross bars 30a, 30b, and 30c) over the hook bar 24 at a desired height by receiving section 24a of the cross bar 24 in one of the spaces 34. The task of hanging the mirror over the door is rendered trivial.

Figure 6:
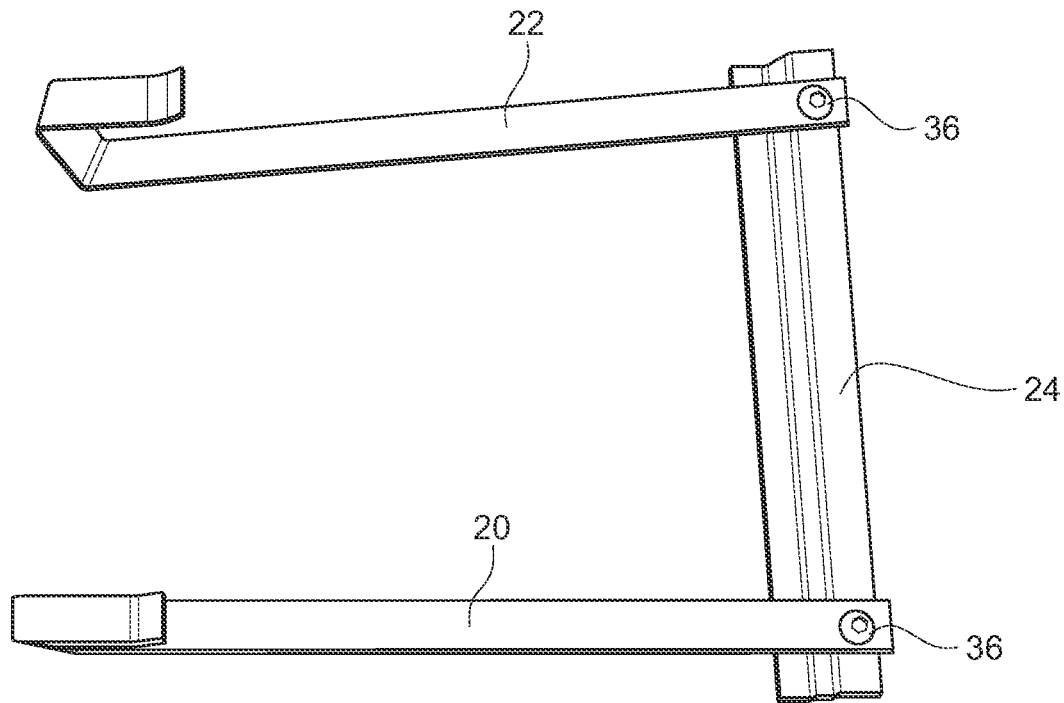
FIG. 6 shows a hanger of an apparatus according to the preferred embodiment of the present invention with the hanging brackets in an open state for use.
Figure 7:
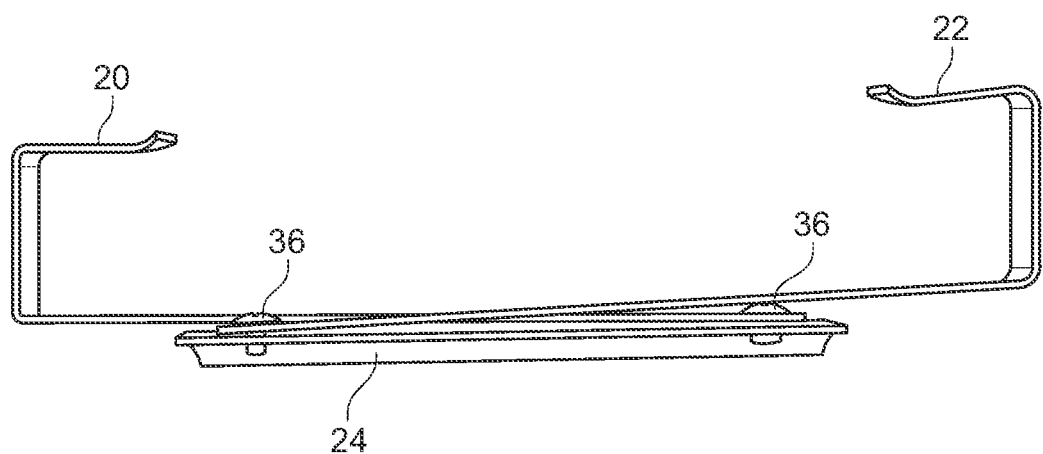
FIG. 7 shows the hanger of FIG. 6 with the hanging brackets thereof in a folded state.

Referring to FIGS. 6 and 7, in the preferred embodiment, the hanging brackets 20, 22 may be rotatably connected to a hook bar 24 with screws, rivets 36 or the like to permit, for example, folding of the hanging brackets 20, 22, which would make it easier to ship the hanger.

Alternatively, the hanging brackets 20, 22 and the hook bar 24 may be rigidly (fixedly) attached or integrated to prevent rotation of the hanging brackets 20, 22. For example, the hanging brackets 20, 22 and the hook bar 24 may be integrated to form a unitary body by, for example, welding, or may be formed by shaping a flat, for example, metallic web, whereby the hanging brackets 20, 22 and the hook bar 24 form a unitary body.

An apparatus according to the present invention may be provided with shims we pre-applied adhesives to be inserted under the "C" (hook) sections of the hanging brackets 20, 22 and the door for leveling as needed.

While the hook bar 24 and the cross bars 30a, 30b, 30c, are shown herein, may be formed by shaping an elongated flat metallic web, any other configuration could be used to realize an apparatus according to the present invention. For example, a rigid elongated tube could be used to form the hook bar 24 and/or the cross bars 30a, 30b, 30c.

Figure 8:
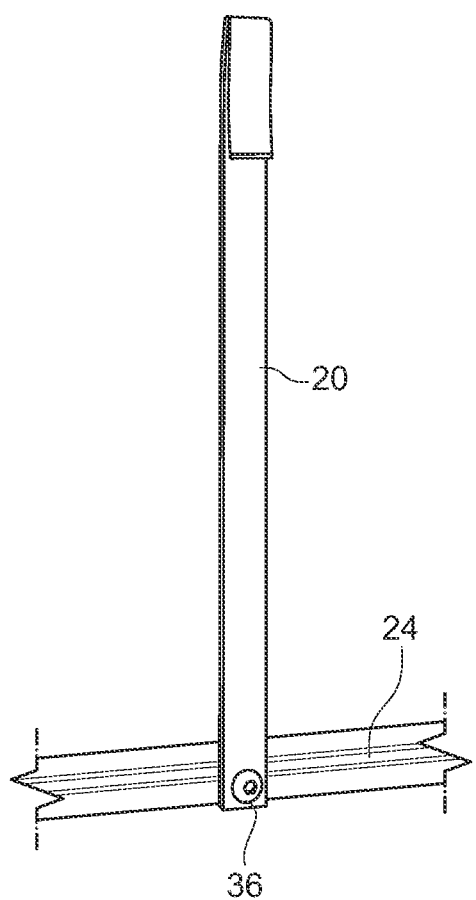
FIG. 8 shows a hanger for an apparatus according to the present invention with one hanging bracket.

Referring to FIG. 8, instead of two hanging brackets 20, 22, one hanging bracket, for example, hanging bracket 20, could be used with a hook bar 24 fixedly (welded, for example) or rotatably (with a rivet, for example) connected at its center to the one hanging bracket. The width of the single hanging bracket can be made wider than shown for maintaining horizontal stability, e.g. by making the width of the top of the bracket which wraps around the top of the door more than 3 inches wide.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A hanging mirror assembly including a mirror and a mirror hanger therefor, the hanging mirror assembly being suitable for hanging the mirror over a door at an adjustable height, the mirror assembly comprising:

the mirror comprising an elongate mirror body having front mirrored surface and a rear side with left and right lengthwise extending edges;

at least three horizontally extending cross bars, each said cross bar being fixedly mounted to the rear side of the mirror body and extending from said left edge to said right edge and providing a hooking space under each cross bar, said at least three cross bars extending parallel and being spaced relative to each other along a length dimension of said mirror body;

the mirror hanger comprising first and second hanger brackets that are both rotatably connected at one distal end thereof to a single hook bar and a respective opposite distal end of each said first and second hanger bracket comprises a reentrantly bent C-section hook that fits over a door top; and said single hook bar being configured to be insertable into a selected one of the hooking spaces defined by the at least cross bars, in a manner that enables the mirror hanger to support the mirror on a selected one of said at least three cross bars at a desired height.

2. The apparatus of claim 1, further comprising shims insertable between the hanging brackets and the door for selective leveling of the hanger.

3. The apparatus of claim 2, wherein each shim has an adhesive layer thereon.

4. The apparatus of claim 1, wherein the hanging brackets and the hook bar form a unitary body.

* * * * *